(No Model.) 2 Sheets—Sheet 1.
H. G. LANE.
WAGON.
No. 387,237. Patented Aug. 7, 1888.
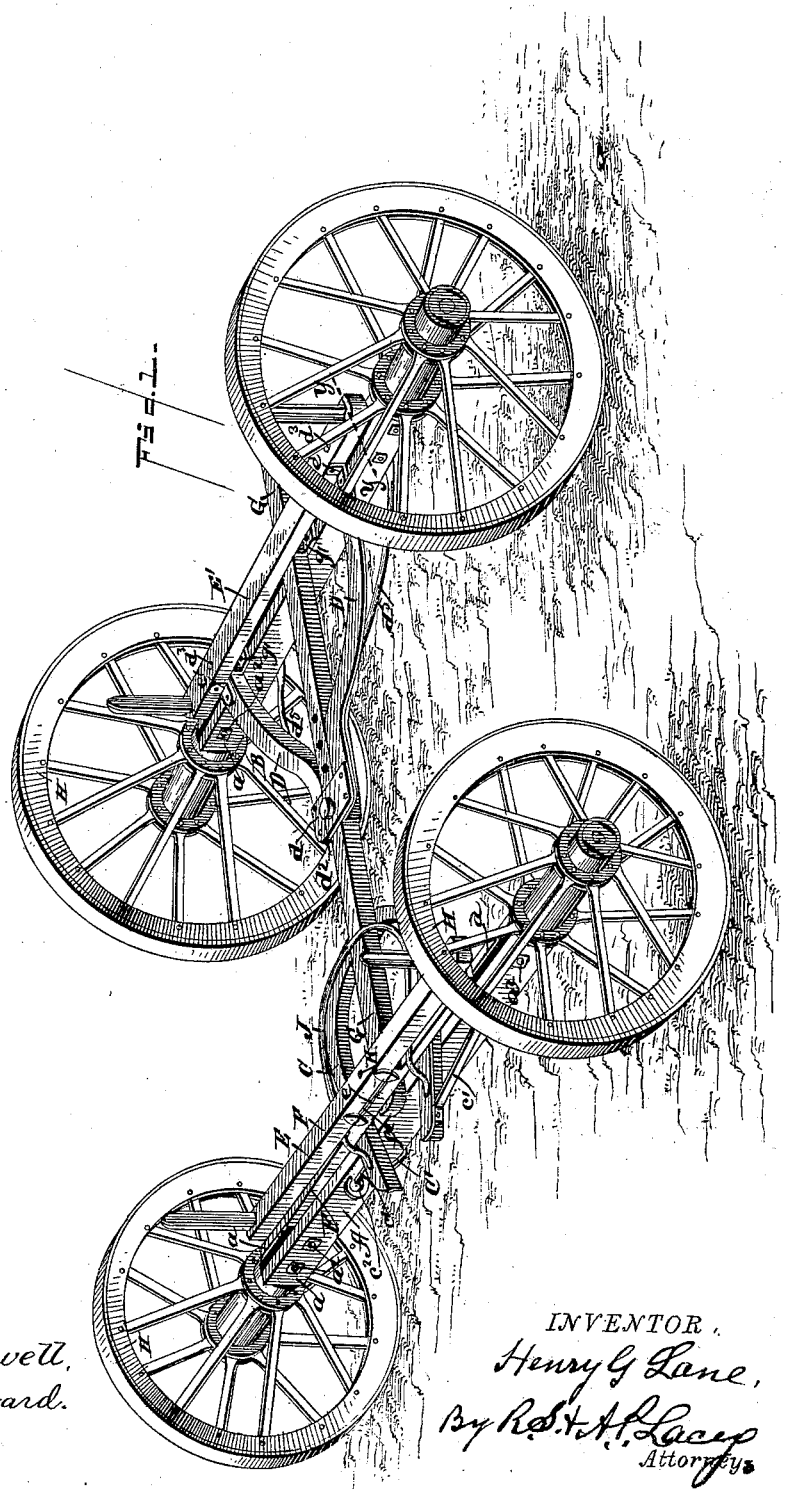
WITNESSES.
Edwin L. Yewell,
Van Buren Hillyard.
INVENTOR.
Henry G. Lane,
By R. S. & A. P. Lacey
Attorneys (No Model.) 2 Sheets—Sheet 2.
H. G. LANE.
WAGON.
No. 387,237. Patented Aug. 7, 1888.
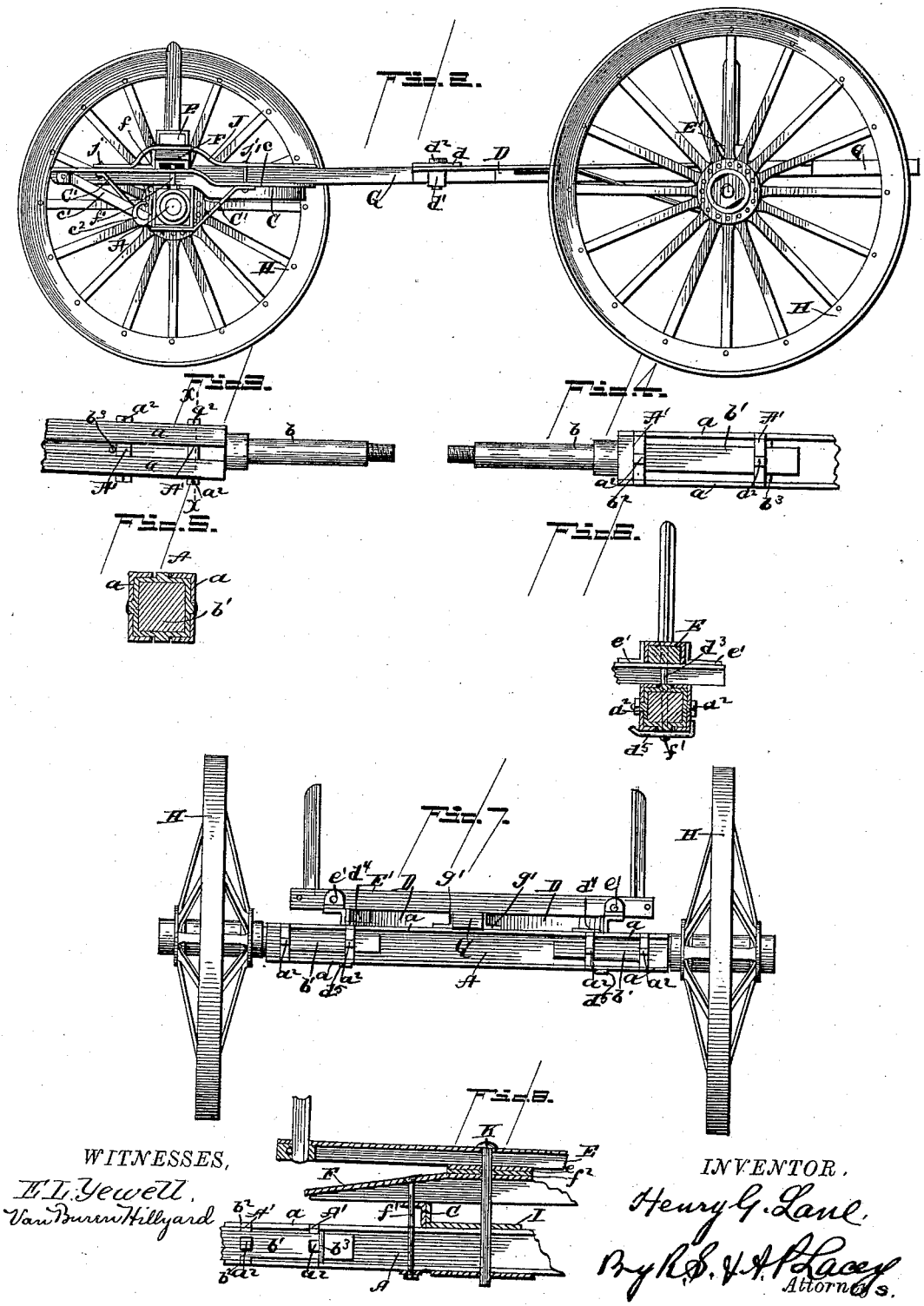
WITNESSES,
F. L. Yewell.
Van Buren Hillyard
INVENTOR.
Henry G. Lane,
By R. S. & A. P. Lacey
Attorneys.

UNITED STATES PATENT OFFICE.

HENRY G. LANE, OF BUCYRUS, OHIO.

WAGON.

SPECIFICATION forming part of Letters Patent No. 387,237, dated August 7, 1888.

Application filed March 19, 1888. Serial No. 267,755. (No model.)

*To all whom it may concern:*

Be it known that I, HENRY G. LANE, a citizen of the United States, residing at Bucyrus, in the county of Crawford and State of Ohio, have invented certain new and useful Improvements in Wagons and Carriages; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to running-gear for vehicles, and has for its object the provision of a running-gear of metal that will be simple, compact, light, durable, and readily interchangeable in all its parts. The main parts of the running-gear will be constructed of an angle metal—that is, metal of comparatively thin stock, having one or both edges flanged—which will produce a strong running-gear of comparatively light material.

The invention consists, chiefly, in improving the general structure of the running-gear, especially the handles and the devices for connecting the hounds with the axle and the sand-board.

The invention also consists in the peculiar construction of the axle and the means for connecting the cylindrical axle-arm or cylindrical spindle with the axle, the old-styled spindle being tapering or cone-shaped.

The invention further consists in the novel features which hereinafter will be more fully described and claimed, and shown in the annexed drawings, in which—

Figure 1 is a perspective view of a vehicle running-gear of my invention; Fig. 2, a side view, parts being broken away, of the front hounds, showing the means for connecting the axle, the hounds, and the sand-board together; Fig. 3, a top plan view of one end of an axle; Fig. 4, a front view, parts being broken away, of the end of the axle shown in Fig. 3; Fig. 5, a cross-section of the axle on the line X X of Fig. 3; Fig. 6, a cross-section of the rear axle on the line Y Y of Fig. 1; and Fig. 7 a rear end view, parts being broken away, of the running-gear.

The running-gear is composed of the usual and well-known parts, as the front and the rear axles, A and B, respectively, the front and the rear hounds, C and D, the front and the rear bolsters, E and E', the sand-board F, the reach or coupling-pole G, and the wheels H. The axles A and B and each end of the axles are constructed exactly alike; hence a description of one axle and an end of an axle will suffice for all. The axle is composed of two corresponding angle-bars, $a$ $a$, each of which has both edges flanged, the two bars being placed with the flanged edges opposing each other and held together by suitable means, preferably by the frames A', which are placed between the bars and bolted thereto. These frames are located near the ends of the axle and fit snugly between the flanges of the angle-bars and have lateral arms $a'$, which are threaded and extend through the sides of the bars $a$ and receive nuts $a^2$. Instead of the nuts, the ends of the arms $a'$ may be upset, or the arms $a'$ may be replaced by bolts, which will be screwed into the sides of the frame, the heads of the bolts bearing against the sides of the bars. There may be as many of these frames A' as desired, two being sufficient for ordinary purposes.

The axle arm or spindle $b$ proper is in the form of a cylinder (instead of the old-styled cone-shaped spindle) having the shank $b'$, and is secured to the axle by having the shank $b'$ fitted in the frames A', being held therein by the shoulder $b^2$ at one end of the shank and the pin or key $b^3$ at the other end, which extends through the shank and bears against the frame. The shoulder $b^2$ prevents inward motion of the spindle, and the key $b^3$ prevents any outward movement of the spindle. The shank $b'$ is angular in cross section, and the openings in the frames are of corresponding shape to prevent rotary movement of the spindle. By withdrawing the key $b^3$ the spindle can readily be removed for any purpose whatsoever, as will be easily understood, said axle-arm or spindle $b$ proper being cylindrical in form and made of a uniform diameter for the purpose of avoiding the difficulty under the old style of fitting each hub-box and spindle to each other, or always securing pairs or mates, thus forming a spindle which the hub-box will not lock on, as in the old style, commonly called a "hot-box."

The front or tongue hounds, C, are of the usual horseshoe shape and rest on the axle A midway of their ends. That portion of the hounds to the rear of the axle is bent down, so that its upper surface will be about flush with or in the plane of the top of the axle to prevent any canting of the hounds to accommodate the reach or pole G and permit the hounds to occupy a horizontal position. The truss-braces C', secured to the under side of the axle, have their ends fastened to the horizontal flange $c$ of the hounds in the front and the rear of the said axle, respectively. The plate I, secured to the top of the axle, and having its ends bent up at right angles and bearing against the inner sides of the hounds, braces the hounds laterally. The sand-board F, arch shaped and having its edges flanged, rests on top of the hounds, and is secured thereto by the angle-brackets $f$ and the vertical bolts $f'$, which also secure the truss-braces C' to the axle. The chest of the sand-board is provided with the wear-plate $f^2$, which acts in opposition to a corresponding wear-plate, $e$, on the bolster E.

The guard-rail J, placed over the hounds C and parallel therewith, extends over the sand-board, and has its front ends bent down and secured to the horizontal flange $c$ of the hounds by the bolts $j$, which likewise secure the front ends of the truss-braces C' to the hounds. The bolts $j'$ secure the guard-rail to the hounds in the rear of the axle, and also secure the rear ends of the truss-braces to the said hounds. The lateral braces $c'$ of the hounds are secured to the axle by the hook-bolts $c^2$, which are designed to receive the tongue-braces. (Not shown.) The bolsters are composed of angle-iron that have both edges flanged, and have stakes at each end, which are provided with a rib or flange between its edges.

The rear hounds, D, have their front ends converging and united by the upper plate, $d$, and the lower clip, $d'$. The reach or pole passes between the ends of the hounds and the plates $d$ and $d'$ and is held therein by the pin $d^2$, which is adapted to pass through the plates $d$ and $d'$ and any of the series of openings $g$ in the reach or pole. The rear ends of the hounds are connected to the axle by the vertical bolts $d^3$, the angle-brackets $d^4$, and the braces $d^5$, which are fastened at their front ends to the hounds and at their rear ends to the under side of the axle by the bolts $d^3$.

The rear bolster, E', is secured to the hounds D and the axle B by the bolts $d^3$ and the angle-brackets $e'$. The reach or pole G extends between the hounds C and the guard-rail J and is connected to the front axle by the king-bolt K, and its rear end passes between the rear axle and the rear bolster and is held against lateral displacement by the angle-brackets $g'$, secured to the rear axle.

Having thus described my invention, what I claim, and desire to secure by Letters Patent, is—

1. The herein-described running-gear for vehicles, composed of the front and rear axles formed from double-flanged bars, the axle-arms removably held between the ends of the angle-bars, the front hounds having their rear portion bent down, the guard-rail, the truss-braces secured to the horizontal flange of the hounds, the sand-board made of metal and having flanges at its edges, the rear hounds having their front ends converging and united by an upper and a lower plate, the reach, the angle-brackets for the reach on the rear axle, the bolsters of double-flanged angle metal, and the stakes having rear ribs constructed, arranged, and operating substantially as specified.

2. In a running-gear for vehicles, the combination of the front axle, the hounds having their rear portions bent down to about flush with the top of the axle, the sand-board resting on the hounds, the guard-rail J, located above the hounds and parallel therewith, the reach passing between the hounds and the said guard-rail J, the truss-braces C', the bolts $f'$, securing the hounds, the sand-board, the axle, and the truss-braces together, the bolts $j$, securing the front ends of the truss, the guard-rail, and the hounds together, and the bolts $j'$, holding the rear ends of the truss-braces, the hounds, and the said guard-rail J together, substantially as described.

3. The combination, with the axle composed of two bars and the frames arranged between and bolted to the bars, of the axle-arm held in the frames, substantially as specified.

4. The combination, with the axle composed of two double-flanged bars arranged with the flanged sides opposite to each other, and the frames placed between the bars and the flanges and secured to the said bars, of the axle-arm having a shank inserted in the frames and held therein by a shoulder at one end of the shank and a key at the other end of the shank, substantially as described.

5. The combination, with the axle composed of two double-flanged angle-bars, of the frames having lateral arms, which arms extend through the bars and are secured thereto, substantially as specified, for the purpose described.

In testimony whereof I affix my signature in presence of two witnesses.

HENRY G. LANE.

Witnesses:
 ISAAC CAHILL,
 D. C. CAHILL.